March 16, 1937.                J. R. WILEY                2,073,722
                             EXPANDING BUNG
                           Filed Oct. 15, 1935
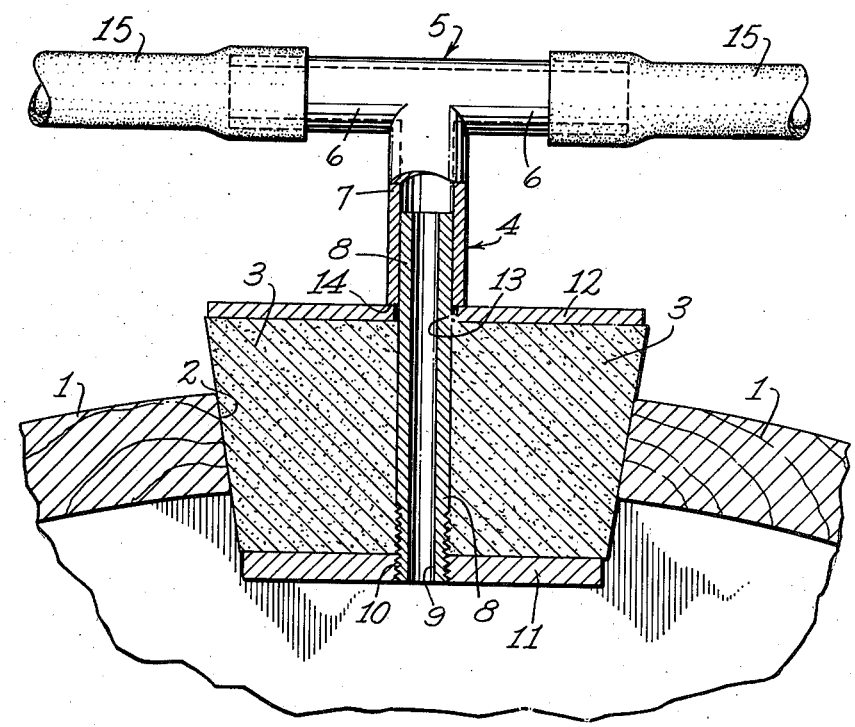
Inventor
Joseph R. Wiley Patented Mar. 16, 1937

2,073,722

UNITED STATES PATENT OFFICE 2,073,722

EXPANDING BUNG

Joseph R. Wiley, Los Angeles, Calif., assignor to Tay Garnett, Los Angeles, Calif.

Application October 15, 1935, Serial No. 45,015

3 Claims. (Cl. 217—109)

This invention relates to an expansible bung.

The general object of the invention is to provide a bung of this type that is capable of being employed to connect a series of casks or barrels to a common hose line or tube, to enable communication to be maintained through the hose to the interiors of the barrels.

It is, of course, not novel merely to construct a bung so that it is expansible, but the expansible bungs heretofore produced, usually necessitate the use of a special nut that performs the function of tightening up the bung.

One of the objects of my invention is to provide a bung with means for facilitating the connection of hose to the barrels, and which, when rotated, will operate to tighten up the bung.

A further object of the invention is to provide an expansible bung of few parts and inexpensive to manufacture, and which will be particularly serviceable for connecting up the interiors of a series of barrels or casks.

Further objects of the invention will appear hereinafter.

The invention consists in the novel parts and combination of parts to be described hereinafter, all of which contribute to produce an efficient expanding bung.

A preferred embodiment of the invention is described in the following specification, while the broad scope of the invention is pointed out in the appended claims.

The drawing is a partial elevation and partial section through an expansible bung embodying my invention, and also showing a portion of the barrel in cross-section at the bung-hole.

Referring more particularly to the parts, 1 indicates a barrel or cask having a bung-hole 2. The wall of the bung-hole usually has a slight taper.

In order to enable the barrel to be connected up with other barrels with hose connections, I provide an expanding bung having a body 3 of yielding material such as soft rubber, said body being preferably slightly tapered to conform with the taper of the wall of the bung-hole. The body 3 is provided with a central opening to receive the lower end of a stem 4, said stem including a tubular T connection 5 having a tubular cross bar 6 and a vertical tubular shank 7 that extends downwardly. The stem 4 includes a downward extension 8, which is also tubular, and the upper end of which is secured in the lower end of the shank 7 of the T 5. The extension 8 has a small bore 9 that communicates with the interior of the shank 7, and the lower end of the tubular extension 8 is provided with threads 10 which screw into a threaded opening in a lower clamping plate 11 that seats against the lower end of the expansible body 3. On the upper face of the expansible body 3 an upper clamping head or plate 12 rests, said plate having a central opening 13 to receive the tubular extension 8, and the edge of this opening is located directly under the lower end of the shank 4, which forms a shoulder 14 on the stem to engage this part.

With the construction described, it will be evident that after placing the bung in the bung-hole as illustrated, by rotating the cross-head 6 that forms the upper end of the T connection, the clamping heads or plates 11 and 12 will be drawn toward each other so as to press the body 3, causing the same to become tight in the bung-hole. The fact that the cross-head 6 is of tubular form with open ends, enables the barrel to be connected up to other barrels by means of flexible hose connections 15, which are slipped over the ends of the cross-head.

The friction between the upper face of the lower clamping head or plate 11 and the lower end of the body 3, is sufficient to insure that the threads on the lower end of the extension 8 will move in the threaded opening 10 without rotating the plate 11. This insures that the thread 10 can be readily tightened up. In this connection it should be understood that the plates 11 and 12 should be slightly clamped on the body 3 when the bung is inserted in the bung-hole.

It will be evident that the cross-head 6 affords means for tightening up the bung, and that it also affords means for effecting the connection to the interior of the barrel, facilitating the connection of a series of barrels so that their interiors are all in communication with each other through hose connections.

What I claim is:

1. In an expansible bung for connecting casks or barrels, the combination of a body of yielding material to be received in the bung-hole of one of the casks, a tubular T having a tubular stem passing down through the yielding body to communicate with the interior of the cask, said stem having threads, and also having a shoulder adjacent the upper face of the said body, an upper clamping head having a central opening receiving said stem and engaging said shoulder, a lower clamping head having a threaded opening engaging the threads, said T having a substantially horizontal tubular cross-bar affording means for rotating said stem to clamp up said body and secure the same in the bung-hole and capable of conducting a fluid past the bung to another cask or barrel.

2. In an expansible bung for connecting casks or barrels, the combination of a body of yielding material to be received in the bung-hole of one of the casks, a tubular T having a tubular stem passing down through the yielding body to communicate with the interior of the cask, said stem having threads, and also having a shoulder adjacent the upper face of the said body, an upper clamping head having a central opening receiving said stem and engaging said shoulder, a lower clamping head having a threaded opening engaging the threads, said T having a tubular cross-head the interior of which communicates with the interior of the stem, said stem having open ends for attachment to hose for admitting gas to the barrel carrying the bung, and conducting the gas to other barrels.

3. In an expansible bung for connecting casks or barrels, the combination of a yielding body to be received in the bung-hole of a barrel, a tubular T having a tubular shank extending downwardly and having a tubular cross-head extending transversely to the shank, a tubular extension of smaller diameter than the shank rigidly secured in the lower end of said shank, extending downwardly through the body and having threads at its lower end, an upper clamping head having an opening receiving said tubular extension, and engaging the end of said shank, said tubular extension opening communication between the tubular cross-head and the interior of the cask, and said cross-head affording means for rotating said tubular extension to clamp up the yielding body and expand the same in the bung-hole, and hose connected to the ends of the tubular cross-head enabling gas to be delivered into the barrel carrying the bung, and conducted to another barrel.

JOSEPH R. WILEY.